(12) United States Patent
Matsumoto et al.

(10) Patent No.: US 7,218,100 B1
(45) Date of Patent: May 15, 2007

(54) ROTATION ANGLE DETECTING DEVICE HAVING FUNCTION OF DETECTING ABNORMALITY

(75) Inventors: Koichiro Matsumoto, Kariya (JP);
Takashi Kawashima, Nagoya (JP);
Tatsuya Kitanaka, Nagoya (JP)

(73) Assignee: Denso Corporation, Kariya, Aichi-pref. (JP)

( * ) Notice: Subject to any disclaimer, the term of this patent is extended or adjusted under 35 U.S.C. 154(b) by 0 days.

(21) Appl. No.: 11/583,064

(22) Filed: Oct. 19, 2006

(30) Foreign Application Priority Data

Oct. 20, 2005 (JP) .............................. 2005-305953
Mar. 16, 2006 (JP) .............................. 2006-072136

(51) Int. Cl.
*G01B 7/30* (2006.01)
(52) U.S. Cl. ............................................... 324/207.25
(58) Field of Classification Search ............ 324/207.25
See application file for complete search history.

(56) References Cited

FOREIGN PATENT DOCUMENTS

| JP | 2002-104211 | 4/2002 |
|---|---|---|
| JP | 2003-75108 | 3/2003 |

*Primary Examiner*—Bot LeDynh
(74) *Attorney, Agent, or Firm*—Nixon & Vanderhye P.C.

(57) ABSTRACT

A rotation angle detecting device includes magnetic field forming members such as a permanent magnet and a yoke, a plurality of magnetic sensors disposed in the magnetic field to rotate relative to the magnetic field forming members to provide output signals that are 90 degrees in phase different from each other, a judgment level calculating circuit that provides a judgment level based on the output signals and judging circuit that judges the output signals normal if the judgment level is within a prescribed range and not normal if the judgment level is out of the prescribed range.

15 Claims, 9 Drawing Sheets

FIG. 4
| V1 | V2 | ROTATION ANGLE (deg) |
|---|---|---|
| + | − | 0~90 |
| + | + | 90~180 |
| − | + | 180~270 |
| − | − | 270~360 |
FIG. 5
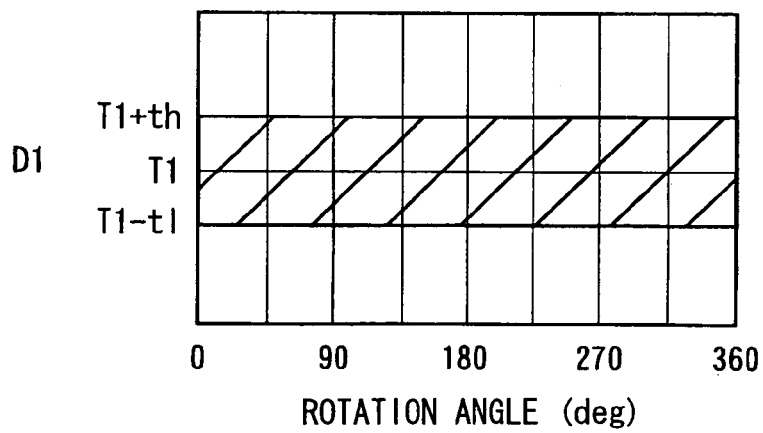
FIG. 6
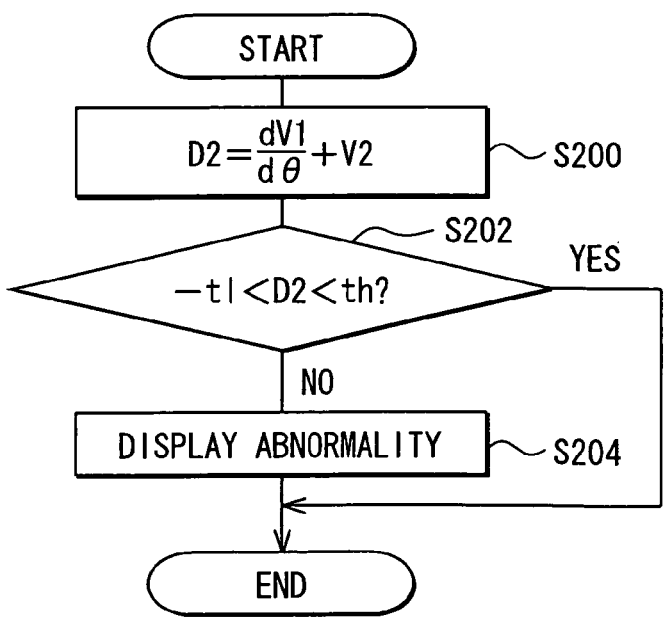

| PAIR | HALL ELEMENT |
|------|--------------|
| P1   | 430, 431     |
| P2   | 431, 432     |
| P3   | 432, 430     |

| JUDGMENT | PAIR | OUTPUT ANGLE |
|---|---|---|
| $D31<T3-tl$ or $D31>T3+th$<br>$T3-tl \leq D32 \leq T3+th$<br>$D33<T3-tl$ or $D33>T3+th$ | P2 | C2 |
| $D31<T3-tl$ or $D31>T3+th$<br>$D32<T3-tl$ or $D32>T3+th$<br>$T3-tl \leq D33 \leq T3+th$ | P3 | C3 |
| $T3-tl \leq D31 \leq T3+th$<br>$D32<T3-tl$ or $D32>T3+th$<br>$D33<T3-tl$ or $D33>T3+th$ | P1 | C1 |

FIG. 16

| JUDGMENT | PAIR | OUTPUT ANGLE |
|---|---|---|
| $D31<T3-tl$ or $D31>T3+th$<br>$T3-tl \leqq D32 \leqq T3+th$<br>$D33<T3-tl$ or $D33>T3+th$ | P2 | V21 AND V22 |
| $D31<T3-tl$ or $D31>T3+th$<br>$D32<T3-tl$ or $D32>T3+th$<br>$T3-tl \leqq D33 \leqq T3+th$ | P3 | V31 AND V32 |
| $T3-tl \leqq D31 \leqq T3+th$<br>$D32<T3-tl$ or $D32>T3+th$<br>$D33<T3-tl$ or $D33>T3+th$ | P1 | V11 AND V12 |

ROTATION ANGLE DETECTING DEVICE HAVING FUNCTION OF DETECTING ABNORMALITY

CROSS REFERENCE TO RELATED APPLICATION

The present application is based on and claims priority from Japanese Patent Applications 2005-305953, filed Oct. 20, 2005 and 2006-72136, filed Mar. 16, 2006, the contents of which are incorporated herein by reference.

BACKGROUND OF THE INVENTION

1. Field of the Invention

The present invention relates to a device for detecting a rotation angle of a rotating object.

2. Description of the Related Art

A rotation angle detecting device for detecting a rotation angle of a rotating object is well-known. For example, such a rotation angle detecting device is installed into an ignition device of an internal combustion engine to detect the rotation angle of an engine crank shaft. However, the internal combustion engine may fail if the rotation angle detecting device fails.

In order to prevent the above problem, JP-A-2002-104211 proposes to provide a rotation angle detecting device with an abnormality detecting function to be used for a motor-driven power steering system. This rotation angle detecting device includes a motor-rotation-angle sensor of a steering-shaft-driving motor and a steering-angle sensor of a steering shaft, so that the abnormality can be detected by comparing the motor-rotation-angle with the steering-angle. That is, in order to prevent the above-stated problem, the rotation angle detecting device disclosed in JP-A-2002-104211 necessitates a motor-rotation-angle sensor in addition to the steering-angle sensor.

SUMMARY OF THE INVENTION

Therefore, an object of the invention is to provide a rotation angle detecting device that does not necessitate the motor-rotation-angle sensor.

According to a feature of the invention, a rotation angle detecting device for detecting a rotation angle of a rotating object includes magnetic field generating means for providing magnetic field, sensing means for providing output signals that are 90 degrees in phase different from each other, a judgment level calculating means for providing a judgment level based on the output signals, the judgment level is within a prescribed range when the output signals are normal and out of the prescribed range when one of the output signals is not normal, and judging means for judging the judgment level normal or not normal.

Accordingly, an abnormality can be detected by calculation based on the output signals of the hall elements without providing additional detecting element.

In the above rotation angle detecting device the magnetic sensors are preferably disposed to have 90 degrees in angle to each other.

On the other hand, the magnetic sensors may be disposed to have an angle other than 90 degrees between them. In this case, the sensing means further includes converting means for converting sensor signals to the output signals that are 90 degrees in phase different from each other.

The output signals may be sinusoidal signals V1, V2 that are respectively proportional to sine θ and cos θ, wherein θ is a rotation angle, and the judgment level D1 is calculated from the following expression: $D1 = V1^2 + V2^2$. On the other hand, the judgment level may be calculated by adding differentiated or integrated values of the sinusoidal signals so as to become zero when the output signals are normal and not zero when one of the output signals is not normal. For example, the judgment level is calculated by the following expression: $dV1/d\theta + V2$.

The plurality of magnetic sensors may be comprised of a plurality of pairs of magnetic sensors. In this case, the judging means judges the judgment level of each pair of the magnetic sensors normal or not normal, and the sensing means outputs the pair of output signals that are judged to be normal.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 4 is a table showing levels of hall element's output signals and rotation angles;

FIG. 5 is a graph showing a relationship between a rotation angle and a judgment level D1;

FIG. 6 is a flow diagram showing a process of detecting an abnormality of a rotation angle detecting device according to the second embodiment of the invention;

FIG. 16 is a table for judging normality of a group of hall elements.

DETAILED DESCRIPTION OF THE PREFERRED EMBODIMENTS

Various embodiments of the present invention will be described with reference to the appended drawings.

A rotation angle detecting device 1 according to the first embodiment of the invention will be described with reference to FIGS. 1–5.

Figure 2:
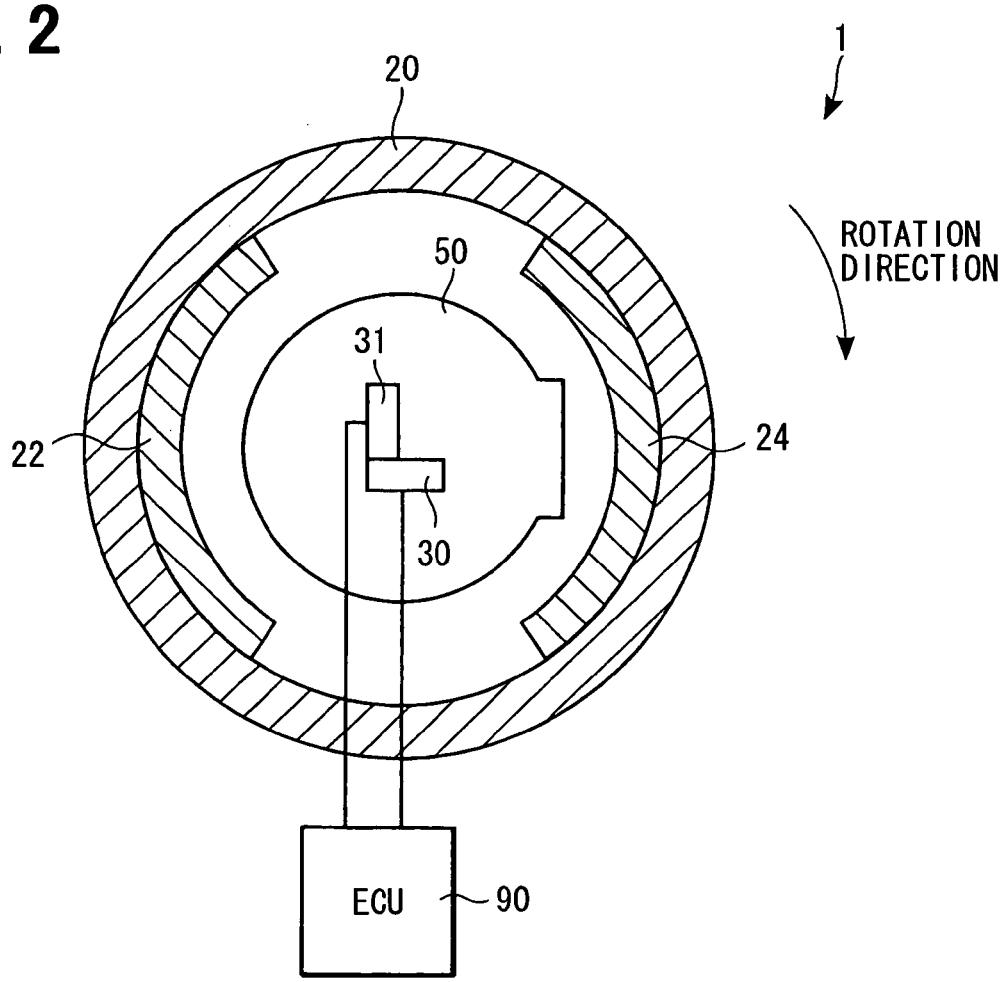
FIG. 2 is a schematic diagram illustrating a rotation angle detecting device according to the first embodiment of the invention.

As shown in FIG. 2, the rotation angle detecting device 1 according to the first embodiment of the invention includes a cylindrical magnetic yoke 20, a pair of arc-shaped permanent magnets 22, 24, a magnetic sensor unit comprised of a pair of hall elements 30, 31, a support member 50 and an ECU 90. The yoke 20 and the permanent magnets 22, 24 form a magnetic field. The permanent magnets 22, 24 are fixed to the inner surface of the cylindrical yoke 20 spaced apart from each other at an angle of 180 degrees to form a magnetic field of a uniform magnetic flux density in the vicinity of the hall elements 30, 31.

The hall element 30 and the other hole element 31 are fixed to the support member 50 along the rotation direction of the rotating object to have an angle of 90 degrees between them. In other words, they are disposed to be perpendicular to each other to form an L-shape. When the rotating object rotates, the hall elements 30 and 31 rotates relative to the yoke 20 and the permanent magnets 22, 24. Accordingly, the hall element 30 and the another hall element 31 generate sinusoidal electric signals that are 90 degrees in phase different from each other.

Incidentally, the hall elements 30, 31 can be operated by a constant current source or a constant voltage source. The hall elements 30, 31 can be replaced by other magnetic sensors, such as magneto-resistance elements.

The ECU 90 includes a nonvolatile memory such as a flash memory that stores a rotation angle detection program, a volatile memory that temporarily stores the rotation angle detection program and various data and a CPU that executes the rotation angle detection program.

Figure 3A:
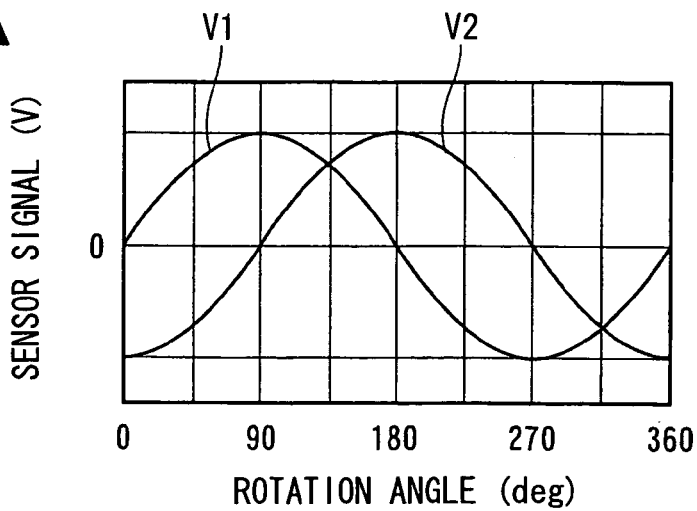
FIGS. 3A, 3B and 3C are graphs showing relationship of the rotation angle with hall element's output signals, arithmetic angles and output angles.

When the rotating objects rotates, the hall elements 30, 31 respectively generate sinusoidal output signals V1, V2, which are 90 degrees in phase different from each other, as shown in FIG. 3A. That is, the hall element 30 generates a sine wave voltage output signal V1, and the hall element 31 generates a cosine wave voltage output signal V2.

Assuming that: the rotation angle is $\theta$; a coefficient that relates to the sensitivity of the magnetic sensor is k; the magnetic flux density of the composite magnetic field is B; and an amount of current supplied to the hole elements is I, the output signals V1, V2 and the rotation angle $\theta$ can be expressed as follows.

$$V1 = kBI \sin\theta \quad (1)$$

$$V2 = kBI \sin(\theta-90) = -kBI \cos\theta \quad (2)$$

The ECU 90 executes the rotation angle detection program to detect the rotation angle of the rotating object based on the output signals V1, V2. The rotation angle detection program is executed whenever the rotation angle detecting device is operated.

At first, $\tan\theta$ is calculated, and then an arithmetic angle $\theta$ is calculated as follows.

$$-V1/V2 = \sin\theta/\cos\theta = \tan\theta \quad (3)$$

$$\theta = \arctan(V1/V2) \quad (4)$$

Figure 3B:
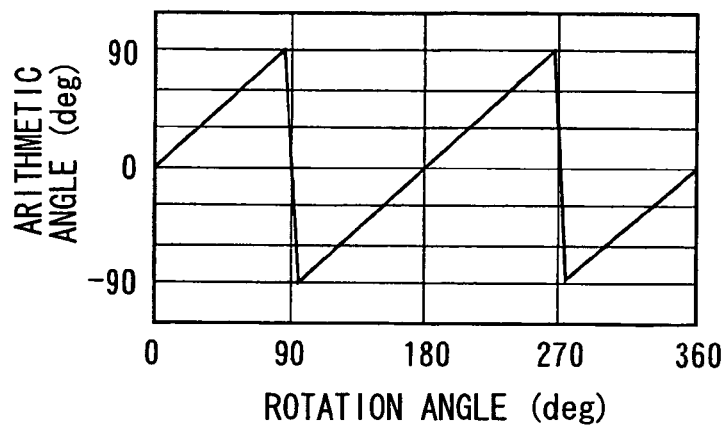
Figure 3C:
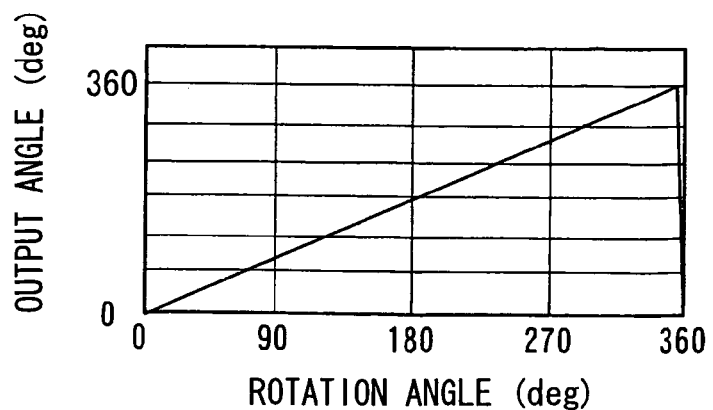

As shown in FIG. 4, the ECU 90 examines whether the sign of the output signals V1, V2 is plus (+) or minus (−) to discriminate four ranges of the rotation angle in 360 degrees. The ECU 90 adds an offset angle to the arithmetic angle $\theta$, which changes at a cycle of 180 degrees as shown in FIG. 3B, based on the discrimination to obtain an output angle, which changes at a cycle of 360 degrees as shown in FIG. 3C.

However, if any of the hall elements 30, 31 fails or is disconnected from the ECU 90, the rotation angle detecting device 1 outputs an abnormal voltage signal. A CPU of the ECU 90 executes an abnormality detecting module that is included in the rotation angle detection program.

Figure 1:
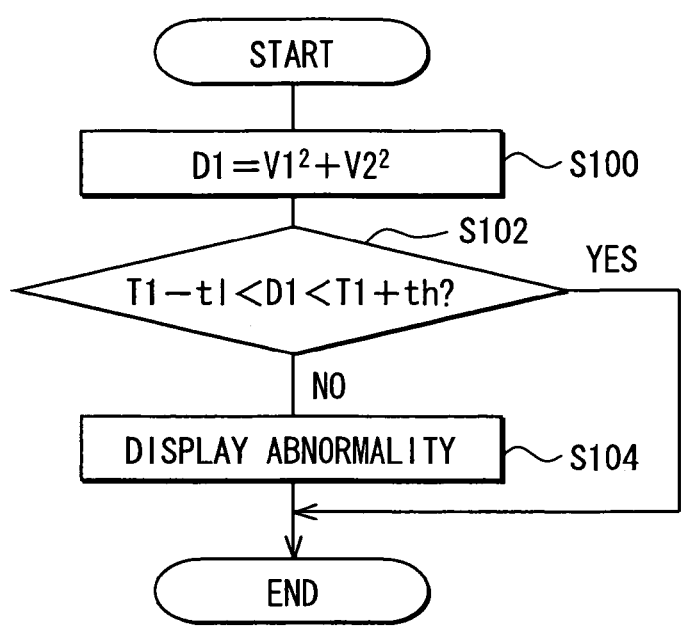
FIG. 1 is a flow diagram showing a process of detecting an abnormality of a rotation angle detecting device according to the first embodiment of the invention.

The abnormality detection by the ECU 90 is shown in FIG. 1. At step S100, a judgment level D1 is calculated by the following expressions:

$$D1 = V1^2 + V2^2 = T1(\sin^2\theta + \cos^2\theta) \quad (5)$$

$$T1 = k^2 B^2 I^2 \quad (6)$$

If the output signals of the hall elements 30, 31 are normal, T1 is constant as shown in FIG. 5. On the other hand, T1 changes if any output signal of the hall elements 30, 31 is not normal.

Subsequently, whether the judgment level D1 is larger than T1−t1 and smaller than T1+t1 or not is examined at S102. Incidentally, the judgment level is stored in a flash memory of the ECU 90. If the judgment level D1 is not between T1−t1 and T1+t1, or the result of the examination is NO, the ECU 90 takes a countermeasure, such as displaying of an abnormality, at S104.

Thus, abnormality can be detected by calculation based on the output signals of the hall elements without providing additional detecting element.

A rotation angle detecting device 1 according to the second embodiment of the invention will be described with reference to FIGS. 6 and 7. The hardware of the rotation angle detecting device 1 is the same as that of the first embodiment.

The abnormality detection by the ECU 90 is shown in FIG. 6. At step S200, the output signal of the hall elements 30 is differentiated and the output signal of the hall element 31 is added thereto to obtain a judgment level D2. That is:

$$D2 = dV1/d\theta + V2 = kBI(\cos\theta - \cos\theta) = 0 \quad (7)$$

Figure 7:
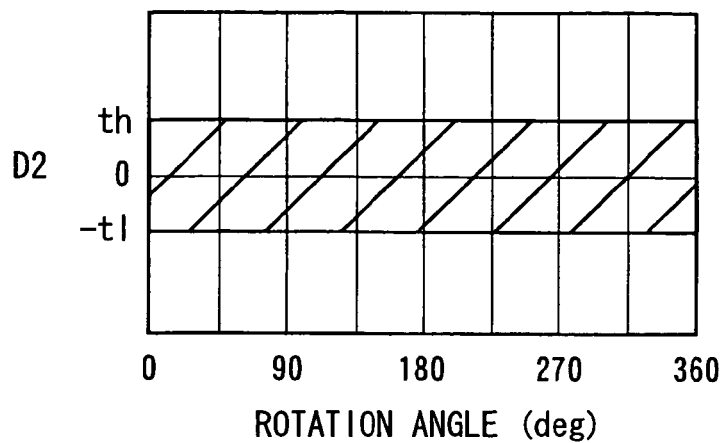
FIG. 7 is a graph showing a relationship between a rotation angle and a judgment level D2 for the second embodiment.

If the output signals of the hall elements 30, 31 are normal, D2 is zero as shown in FIG. 7. On the other hand, D2 changes if any output signal of the hall elements 30, 31 is not normal. Incidentally, the judgment level D2 can be obtained by addition or subtraction after one of the output signals V1, V2 is differentiated or integrated an odd number of times more than the other. In other words, the judgment level D2 is calculated by adding an nth differentiated value of the output signal V1, and an (n+1) th differentiated value of the output signal V2 so that the sum becomes zero when both the output signals V1, V2 are normal and does not become zero when any of the output signals V1, V2 is not normal.

Subsequently, whether the judgment level D2 is larger than −t1 and smaller than th or not is examined at S202. If the judgment level D2 is not between −t1 and th, or the result of the examination is NO, the ECU 90 takes a countermeasure, such as displaying of an abnormality, at S204.

Thus, abnormality can be detected at a high accuracy.

Figure 8:
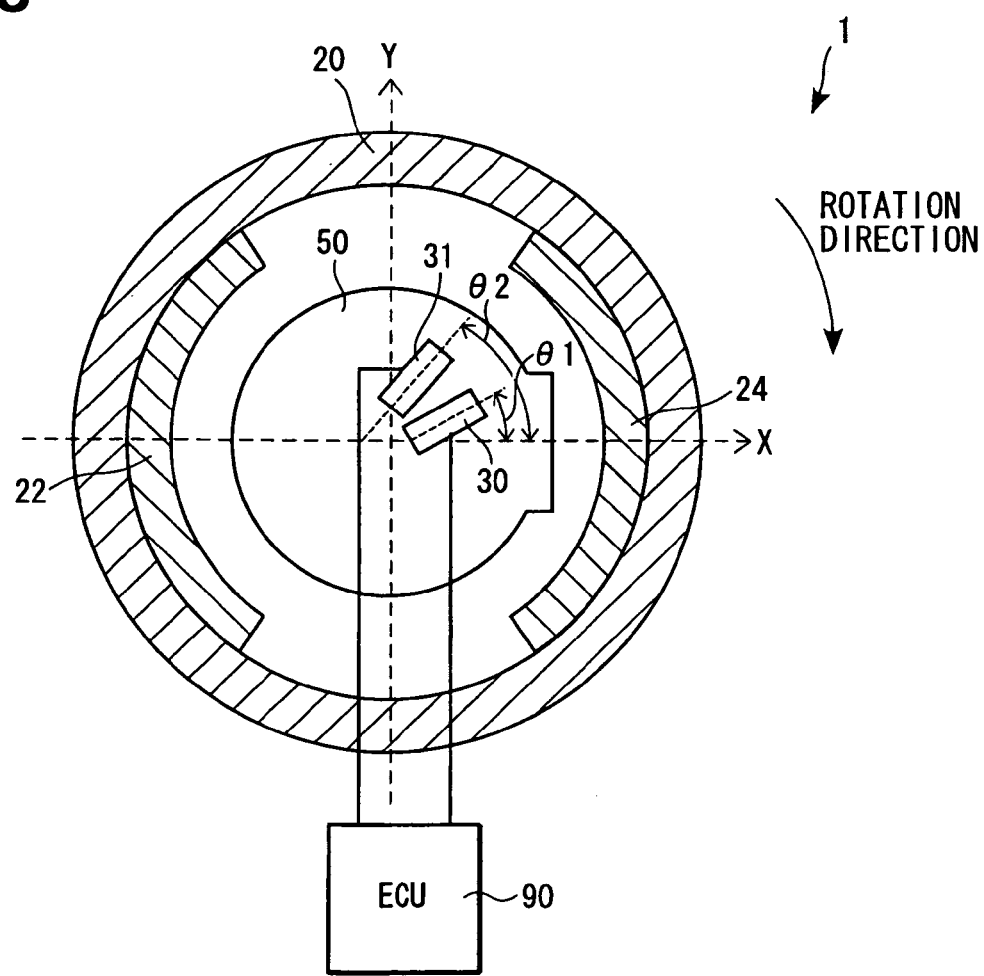
FIG. 8 is a schematic diagram illustrating a rotation angle detecting device according to the third embodiment of the invention.

A rotation angle detecting device 1 according to the third embodiment of the invention will be described with reference to FIGS. 8 and 9.

The rotation angle detecting device 1 according to the third embodiment of the invention includes a cylindrical magnetic yoke 20, a pair of arc-shaped permanent magnets 22, 24, a magnetic sensor unit composed of a pair of hall elements 30, 31, a support member 50 and an ECU 90.

The hall element 30 and the other hole element 31 are fixed to the support member 50 along the rotation direction of the rotating object to have an angle other than 90 degrees between them.

Assuming that the angles of the hall elements 30, 31 relative to the direction X are respectively θ1 and θ2, the sensor signals Vs1, Vs2 and the rotation angle θ can be expressed as follows.

$$Vs1 = kBI \sin(\theta+\theta1) \quad (8)$$

$$Vs2 = kBI \sin(\theta+\theta2) \quad (9)$$

These sensor signals Vs1, Vs2 are converted into the following output signals V1, V2 that are 90 degrees in phase different from each other.

$$V1 = Vs1 \cdot \sin\theta2 - V2 \cdot \sin\theta1 \quad (10)$$

$$V2 = Vs2 \cdot \cos\theta2 - V2 \cdot \cos\theta1 \quad (11)$$

Figure 9:
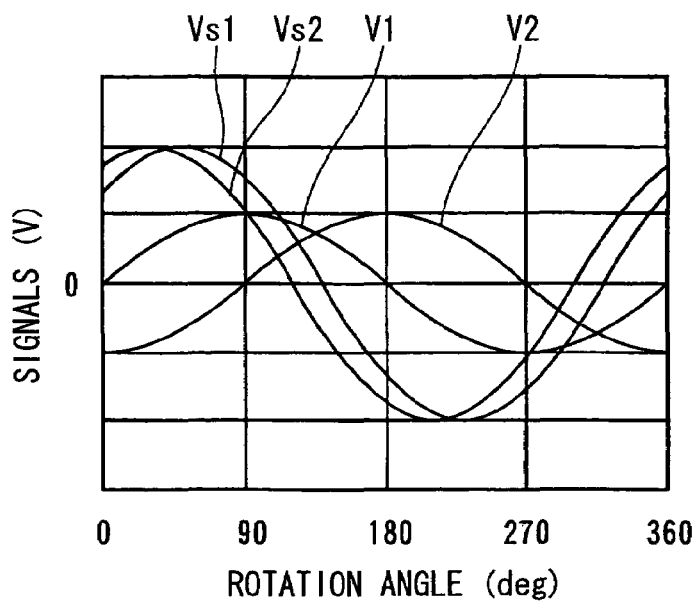
FIG. 9 is a graph showing a relationship between output signals of the rotation angle detecting device according to the third embodiment and other signals thereof.

Thus, the output signals V1, V2 have a sine-cosine relationship, as shown in FIG. 9.

Accordingly, the ECU 90 can calculate the judgment level D1 or D2 in the same manner as the first or the second embodiment.

A rotation angle detecting device 1 according to the fourth embodiment of the invention will be described with reference to FIGS. 10–14.

The rotation angle detecting device 1 according to the fourth embodiment of the invention includes a magnetic sensor unit composed of three hall elements 430, 431, 432 instead of a pair of hall elements 30, 31 of the third embodiment. Other components are the same as the third embodiment.

Figure 10:
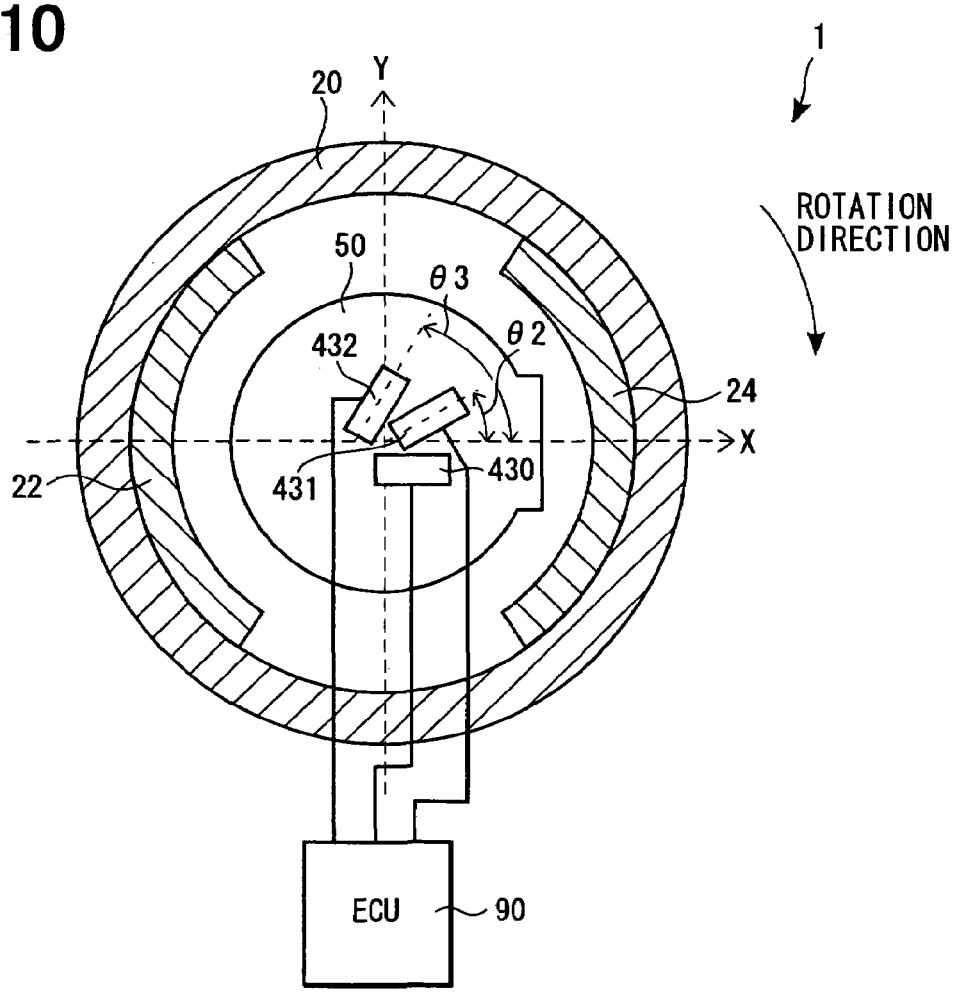
FIG. 10 is a schematic diagram illustrating a rotation angle detecting device according to the fourth embodiment of the invention.

The hall element 430 has an angle of θ1 (e.g. 0 degree) relative to the direction X, the hall element 431 has an angle of θ2 (e.g. 40 degrees) relative to the direction X, and the hall element 432 has an angle of θ3 (e.g. 60 degrees) relative to the direction X, as shown in FIG. 10.

Figures 11, 12:
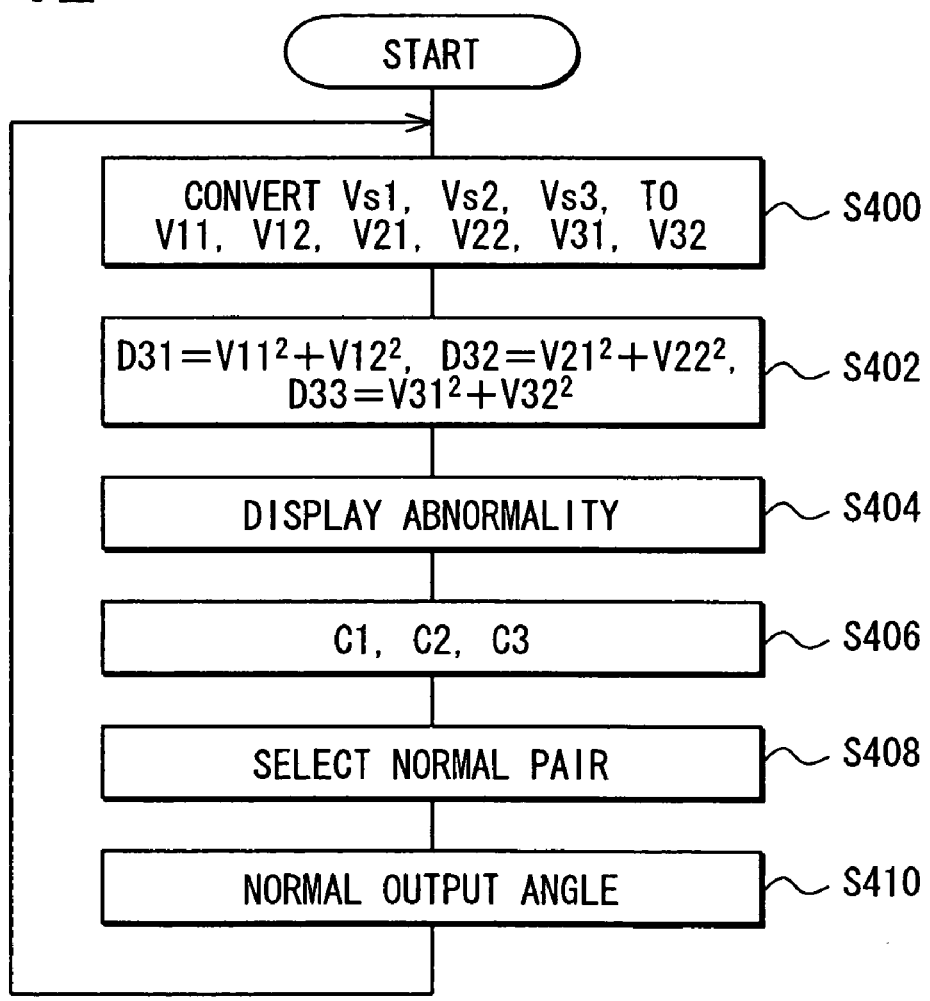
FIG. 11 is a table showing groups of elements and hall elements included in the respective groups of elements.
FIG. 12 is a flow diagram showing a process of detecting an abnormality of a rotation angle detecting device according to the fourth embodiment of the invention.

As shown in FIG. 11, the three hall elements 430, 431, 432 form three pairs P1, P2, P3 of the hall elements.

Figure 13A:
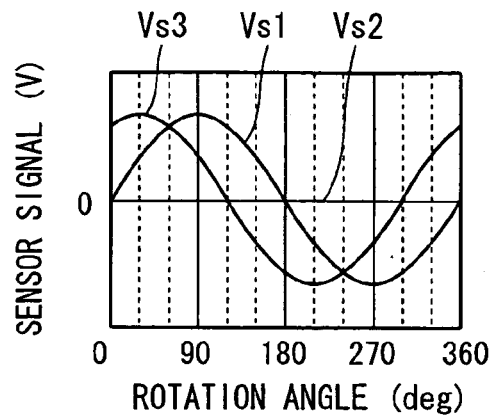
FIGS. 13A, 13B, 13C, 13D and 13E are graphs showing relationships of the rotation angle with sensor signals, output signals and judgment levels.
Figure 13B:
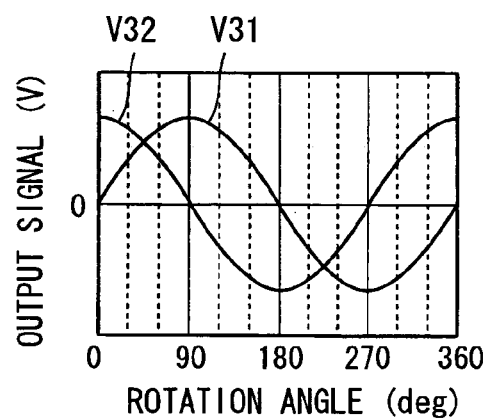
Figure 13D:
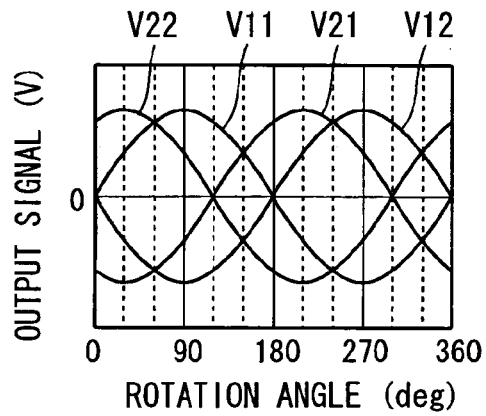

These sensor signals Vs1, Vs2, Vs3 are converted into the following output signals V11, V12, V21, V22, V31, V32, as shown in FIG. 13B and FIG. 13D, in the same manner as that of the third embodiment at step S400 shown in FIG. 12.

$$V11 = k(Vs1 \cdot \sin\theta2 - Vs2 \cdot \sin\theta1) \quad (12)$$

$$V12 = k(Vs1 \cdot \cos\theta2 - Vs2 \cdot \cos\theta1) \quad (13)$$

$$V21 = l(Vs2 \cdot \sin\theta3 - Vs3 \cdot \sin\theta2) \quad (14)$$

$$V22 = l(Vs2 \cdot \cos\theta3 - Vs3 \cdot \cos\theta2) \quad (15)$$

$$V31 = m(Vs3 \cdot \sin\theta1 - Vs1 \cdot \sin\theta3) \quad (16)$$

$$V32 = m(Vs3 \cdot \cos\theta1 - Vs1 \cdot \cos\theta3) \quad (17)$$

In the above expressions, k, l, and m are coefficients to adjust the amplitude of the output signals V11, V12, V21, V22, V31 and V32.

The ECU 90 calculate the judgment levels D31, D32 and D33 by the following expressions at S402.

$$D31 = V11^2 + V12^2 \quad (18)$$

$$D32 = V21^2 + V22^2 \quad (19)$$

$$D33 = V31^2 + V32^2 \quad (20)$$

Subsequently, whether the judgment levels D31, D32, D33 are larger than T3−t1 and smaller than T3+t1 or not is examined at S404.

Figure 13C:
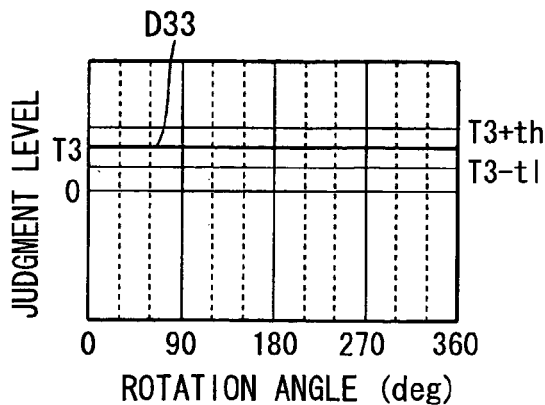
Figure 13E:
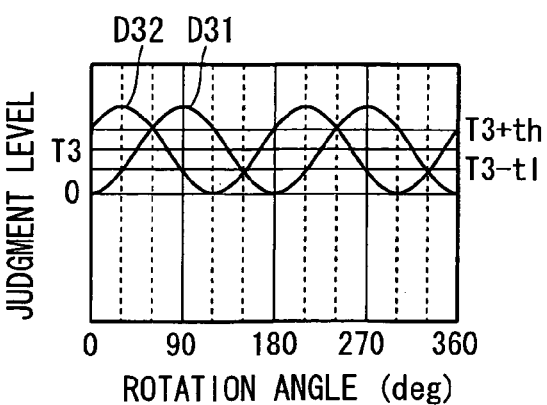

If the signals of the hall elements 430, 431, 432 are normal, the judgment level (e.g. D33) is a constant T3 as shown in FIG. 13C. On the other hand, the judgment level changes if any output signal of the hall elements 430, 431, 432 is not normal, as shown in FIG. 13E. If the judgment level D31, D32 or D33 is not between T3−t1 and T3+t1, or the result of the examination is NO, the ECU 90 takes a countermeasure, such as displaying of an abnormality.

Thereafter, at S406, the ECU 90 calculates a candidate output angle C1 based on the output signals V11 and V12, a candidate output angle C2 based on the output signals V21 and V22 and a candidate output angle C3 based on the output signals V31 and V32, in the same manner as the first embodiment as to calculating an output angle.

Figures 14, 15:
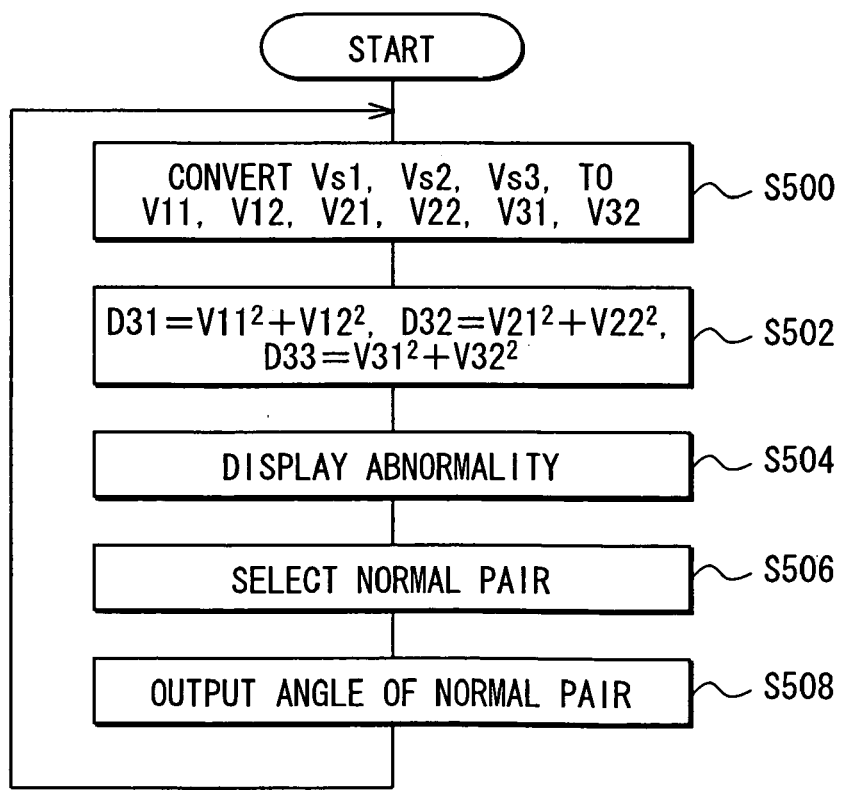
FIG. 14 is a table for judging normality of pairs of hall elements.
FIG. 15 is a flow diagram showing a process of detecting an abnormality of a rotation angle detecting device according to the fifth embodiment of the invention.

Then, a normal pair is selected in a manner as shown in FIG. 14 from the pairs P1, P2, P3 at S408, and a candidate output angle C1, C2 or C3 that corresponds to the normal pair is provided as a normal output angle at S410.

With this embodiment, a correct output angle can be obtained even if one hall element fails.

Three hall elements can be disposed perpendicular to each other. In this case, it is not necessary to convert the sensor signals Vs1, Vs2, Vs3 into the output signals.

A rotation angle detecting device 1 according to the fifth embodiment of the invention will be described with reference to FIGS. 15 and 16.

The rotation angle detecting device 1 according to the fifth embodiment of the invention is substantially the same as the fourth embodiment except for the process of rotation angle detecting operation.

The sensor signals Vs1, Vs2, Vs3 are provided and converted into output signals at S500. The ECU 90 calculate the judgment levels at S502, which is compared with a constant to detect abnormality at S504. Thereafter, the ECU 90 calculates output angles based on the output signals, in the same manner as the fourth embodiment, so that a normal pair is selected from the pairs at S506, and an output angle that corresponds to a normal pair is provided as a normal output angle at S508.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A rotation angle detecting device for detecting a rotation angle of a rotating object comprising:

magnetic field generating means for providing magnetic field;

sensing means, including a plurality of magnetic sensors disposed in the magnetic field to rotate relative to said magnetic field generating means, for providing output signals that are 90 degrees in phase different from each other;

a judgment level calculating means for providing a judgment judgment level based on said output signals, said judgment level being within a prescribed range if said output signals are normal and out of the prescribed range if one of said output signals is not normal; and judging means for judging the judgment level normal or not normal.

2. A rotation angle detecting device as claimed in claim 1, wherein said magnetic sensors are disposed to have 90 degrees in angle to each other.

3. A rotation angle detecting device as claimed in claim 1, wherein:
said magnetic sensors are disposed to have an angle other than 90 degrees between them; and
said sensing means further comprising converting means for converting sensor signals to the output signals that are 90 degrees in phase different from each other.

4. A rotation angle detecting device as claimed in claim 1, wherein:
said output signals are sinusoidal signals V1, V2 that are respectively proportional to sine θ and cos θ, with θ being a rotation angle; and
the judgment level is calculated from the following expression: $V1^2+V2^2$.

5. A rotation angle detecting device as claimed in claim 1, wherein:
the judgment level is calculated by adding differentiated or integrated values of the output signals so that the sum becomes zero when said output signals are normal and does not become zero when one of said output signals is not normal.

6. A rotation angle detecting device as claimed in claim 5, wherein:
the judgment level is calculated by adding a differentiated or integrated value of one of the output signals so that the sum becomes zero when said output signals are normal and does not become zero when one of said output signals is not normal.

7. A rotation angle detecting device as claimed in claim 6, wherein: said output signals are sinusoidal signals V1, V2 that are respectively proportional to sine θ and cos θ, with θ being a rotation angle; and the judgment level is calculated by the following expression: $dV1/d\theta+V2$.

8. A rotation angle detecting device as claimed in claim 5, wherein:
assuming that n is a number, the judgment level is calculated by adding an nth differentiated value of one of the sinusoidal signals and an (n+1) th differentiated value of the other so that the sum becomes zero when said output signals are normal and does not become zero when one of said output signals is not normal.

9. A rotation angle detecting device as claimed in claim 1, wherein:
said plurality of magnetic sensors comprises a plurality of pairs of magnetic sensors;
said judging means judges the judgment level of each pair of said magnetic sensors normal or not normal;
said sensing means outputs the pair of output signals that are judged to be normal.

10. A rotation angle detecting device as claimed in claim 3, wherein:
said output signals are sinusoidal signals V1, V2 that are respectively proportional to sine θ and cos θ, wherein θ is a rotation angle; and
the judgment level D1 is calculated from the following expression: $D1=V1^2+V2^2$.

11. A rotation angle detecting device as claimed in claim 3, wherein:
said output signals are sinusoidal signals V1, V2 that are respectively proportional to sine θ and cos θ, wherein θ is a rotation angle, and
the judgment level is calculated by adding differentiated or integrated values of the sinusoidal signals so as to become zero when said output signals are normal and does not become zero when one of said output signals is not normal.

12. A rotation angle detecting device as claimed in claim 9, wherein:
the judgment level is calculated by adding differentiated or integrated values of the pair of output signals so as to become zero when said output signals are normal and does not become zero when one of said output signals is not normal.

13. A rotation angle detecting device for detecting a rotation angle of a rotating object comprising:
magnetic field generating means for providing magnetic field;
sensing means, including a plurality of magnetic sensors disposed in the magnetic field to rotate relative to said magnetic field generating means, for providing output signals that are 90 degrees in phase different from each other; and
judging means for judging sensing means normal or not normal, wherein said judging means compares a level calculated from said output signals with a prescribed range to judge said output signals normal if the level is within the prescribed range and abnormal if the level is out of the prescribed range.

14. A rotation angle detecting device as claimed in claim 13, wherein:
said output signals are sinusoidal signals V1, V2 that are respectively proportional to sine θ and cos θ, wherein θ is a rotation angle; and
the level is calculated from the following expression: $V1^2+V2^2$.

15. A rotation angle detecting device as claimed in claim 13, wherein:
said output signals are sinusoidal signals V1, V2 that are respectively proportional to sine θ and cos θ, wherein θ is a rotation angle; and
the level is calculated by the following expression: $dV1/d\theta+V2$.

* * * * *